(12) United States Patent
Yamashita et al.

(10) Patent No.: US 7,549,332 B2
(45) Date of Patent: Jun. 23, 2009

(54) FLOW SENSOR AND THROTTLE STRUCTURE

(75) Inventors: Yasuhiro Yamashita, Tsukubamirai (JP); Yuta Oshima, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/765,943

(22) Filed: Jun. 20, 2007

(65) Prior Publication Data

US 2008/0006085 A1   Jan. 10, 2008

(30) Foreign Application Priority Data

Jul. 5, 2006  (JP) .............................. 2006-186080

(51) Int. Cl.
*G01F 1/68* (2006.01)
(52) U.S. Cl. .................................. 73/204.21
(58) Field of Classification Search ............. 73/204.21, 73/861.63, 861.64
See application file for complete search history.

(56) References Cited

U.S. PATENT DOCUMENTS

| | | | | |
|---|---|---|---|---|
| 4,363,238 A | * | 12/1982 | Willam .................... | 73/204.21 |
| 4,448,070 A | * | 5/1984 | Ohyama et al. .......... | 73/204.21 |
| 4,961,348 A | | 10/1990 | Bonne | |
| 5,014,552 A | * | 5/1991 | Kamiunten et al. ...... | 73/204.21 |
| 5,081,866 A | * | 1/1992 | Ochiai et al. ............. | 73/204.21 |
| 5,220,830 A | * | 6/1993 | Bonne ...................... | 73/204.21 |
| 6,240,775 B1 | * | 6/2001 | Uramachi et al. ........ | 73/204.21 |
| 6,591,674 B2 | * | 7/2003 | Gehman et al. .......... | 73/204.22 |
| 6,619,140 B2 | * | 9/2003 | Kitahara et al. .......... | 73/861.52 |
| 6,655,207 B1 | * | 12/2003 | Speldrich et al. ......... | 73/202.5 |
| 6,952,960 B2 | * | 10/2005 | Nozoe et al. ............. | 73/204.21 |
| 7,100,440 B2 | | 9/2006 | Morisawa et al. | |

FOREIGN PATENT DOCUMENTS

| | | |
|---|---|---|
| DE | 196 18 520 | 9/1997 |
| JP | 2004-3883 | 1/2004 |
| JP | 2004-3887 | 1/2004 |
| JP | 2005-315788 | 11/2005 |

\* cited by examiner

*Primary Examiner*—Harshad Patel
(74) *Attorney, Agent, or Firm*—Paul A. Guss (57) ABSTRACT

A flow sensor functions as a flow meter, for measuring the flow rate of a measurement objective fluid. The flow sensor comprises a flow passage, through which the measurement objective fluid flows, a sensor arranged so as to face the flow passage from a top wall that defines the flow passage, a throttle surface opposed to the top wall where the sensor is arranged, and an inclined surface provided on an upstream side of the throttle surface. The inclined surface is disposed such that the flow passage widens toward the inlet side of the flow passage. The inclined surface has an angle such that an extension line thereof passes through a position that is offset toward the upstream side, as compared to the detecting section of the sensor.

8 Claims, 9 Drawing Sheets

FLOW SENSOR AND THROTTLE STRUCTURE

BACKGROUND OF THE INVENTION

1. Field of the Invention

The present invention relates to a flow sensor for measuring a fluid flow rate. In particular, the present invention relates to a flow passage structure of the flow sensor.

2. Description of the Related Art

A flow sensor (flow meter) has been previously suggested, which has a flow passage for allowing a fluid to pass therethrough, and wherein a sensor is installed that faces the flow passage, in order to measure the flow rate of a fluid including, for example, air or nitrogen.

Japanese Laid-Open Patent Publication No. 2005-315788 discloses a flow sensor, comprising a flow passage that is formed by enclosing a groove having an open upper portion with a lid member. A sensor is installed so as to face the flow passage, and each of two meshes (mesh members) are provided at an inlet portion (upstream side) and at an outlet portion (downstream side) of the flow passage. In the flow sensor, measurement accuracy is improved by adjusting the flow rate of the fluid that flows through the flow passage by means of the meshes.

However, in the flow sensor constructed as described above, it is necessary for a plurality of meshes to be installed, in order to maintain the measurement accuracy of the flow rate measured by the sensor. Further, the flow rate of the fluid is subjected to turbulence, due to collisions against the mesh on the downstream side, which is disposed just after the other mesh. Therefore, it is necessary to provide a predetermined distance (length) between the mesh and the sensor, so that turbulence of the fluid can be converged. Therefore, there is a tendency for the flow passage to be prolonged. As a result, the structure of the flow sensor becomes large in size overall. Further, even when dust, dirt or the like becomes adhered to the mesh, it is impossible to exchange the mesh easily. When the mesh is exchanged, it is necessary to perform adjustments again, since the measurement accuracy of the flow sensor fluctuates.

On the other hand, Japanese Laid-Open Patent Publication No. 2004-3887 and Japanese Laid-Open Patent Publication No. 2004-3883 respectively disclose flow sensors that do not use meshes therein, unlike the aforementioned structure, in order to minimize the size of the structure. In such a flow sensor, the flow passage portion where the sensor is positioned is constructed so as to be substantially perpendicular to the flow passage portion disposed upstream therefrom. Further, a circular arc-shaped surface, which protrudes into the flow passage, is formed on at least a part of a wall that defines the flow passage portion where the sensor is positioned. Thus, the flow rate of the fluid can be adjusted without providing any meshes therein.

The flow sensor constructed as described above has a structure so that foreign matter, such as dust, dirt or the like, is removed by the wall surface of the flow passage, which is constructed substantially perpendicularly as described above. However, it is difficult to remove foreign matter when the flow rate of the fluid is large, for example. Further, when the circular arc-shaped surface is formed in a portion of the flow passage where the sensor is positioned, and if fluid having a large flow rate suddenly flows thereinto, then the fluid is lifted upwardly by the circular arc-shaped surface and abuts against the sensor, causing an impact. Thus, depending on the conditions of use, is feared that the sensor may become damaged.

SUMMARY OF THE INVENTION

A general object of the present invention is to avoid damage to a sensor, which is arranged so as to face a flow passage, and which detects the flow rate of a fluid that flows through the flow passage as a measurement objective.

A principal object of the present invention is to provide a flow sensor that can be miniaturized.

According to one aspect of the present invention, a flow sensor comprises a main body including a flow passage formed at least by a top wall and a bottom wall, wherein a measurement objective fluid flows through the flow passage, and a sensor is arranged along the top wall forming the flow passage so as to face the flow passage, wherein the flow passage includes a throttle surface opposed to the sensor, and a first inclined surface formed continuously on an upstream side of the throttle surface, the first inclined surface being disposed such that the flow passage, which is formed between the top wall and the first inclined surface, widens toward the upstream side, and further wherein the first inclined surface has an angle such that an extension line of the first inclined surface, which is directed toward a downstream side, passes through a position offset toward the upstream side, as compared with a detecting section that is provided on a detection surface of the sensor.

In accordance with the aforementioned structure, the flow passage portion, which is disposed between the top wall and the throttle surface, is throttled in comparison with the flow passage portion disposed on the upstream side. Thus, it is possible to adjust the flow of the measurement objective fluid flowing through the flow passage, providing an improvement in measurement accuracy of the sensor. The measurement objective fluid that flows into the flow passage flows along the first inclined surface, and then, the fluid abuts against the top wall on the upstream side, at a position offset from the detecting section of the sensor. Thereafter, the fluid passes along the throttle surface toward the outlet side. Accordingly, for example, even when the measurement objective fluid suddenly flows at a large flow rate, direct collision of the measurement objective liquid with the sensor detecting section is avoided. Therefore, it is possible to avoid damage or breakage of the sensor.

The flow sensor may further comprise a second inclined surface, which is formed continuously on the downstream side of the throttle surface. The second inclined surface is provided such that the flow passage, which is formed between the top wall and the second inclined surface, widens toward the downstream side, wherein the second inclined surface has an angle such that an extension line of the second inclined surface passes through a position offset toward the downstream side, as compared with the detecting section on the detection surface of the sensor. Thus, the flow direction of the flow sensor can be reversed with ease. Therefore, the degree of freedom in installing the flow sensor of the present invention can be greatly improved.

The angle formed by the first inclined surface and the bottom wall that continues on the upstream side of the first inclined surface, and/or the angle formed by the second inclined surface and the bottom wall that continues on the downstream side of the second inclined surface, is preferably not more than 150°. Thus, settings can be made more reliably such that the extension lines of each of the first inclined surface and the second inclined surface pass through a position that is offset more outwardly, as compared to the detecting section of the sensor. Therefore, it is possible to effectively avoid situations in which the measurement objective fluid directly collides with the detecting section of the sensor, after the measurement objective fluid has flowed along the first inclined surface and the second inclined surface. Therefore, damage or breakage of the sensor, for example, can be avoided.

A length of the throttle surface in a flow direction of the measurement objective fluid is larger than a length of the sensor in the flow direction. Therefore, the measurement objective fluid, which is reliably subjected to flow adjustment at the throttle surface portion, successfully flows along the detection surface of the sensor, and thus measurement accuracy can be improved.

A mesh member may be provided on an inlet side and/or an outlet side of the flow passage. Thus, the measurement objective fluid can be subjected more reliably to flow adjustment by the mesh member. Therefore, it is possible to remove, for example, dust, dirt and the like that may be contained within the measurement objective fluid.

The mesh member is attached by means of a fixing screw, thereby allowing the measurement objective fluid to flow through the mesh member. Thus, the mesh member can be exchanged with ease by attachment and detachment of the fixing screw.

Further, the number of mesh members required to be installed, for example, in the inlet portion of the flow passage can be minimized, owing to the flow adjustment function effected by the throttle surface and the first inclined surface. Therefore, the structure of the flow sensor is simplified, enabling further miniaturization of the flow sensor.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A flow sensor according to the present invention shall be explained in detail below, exemplified by a preferred embodiment thereof, with reference to the accompanying drawings.

The flow sensor 10 comprises a flow meter for measuring a flow rate (mass flow rate) of a measurement objective fluid composed of, for example, air or nitrogen. The present invention shall be explained below, with reference to a case in which a flow rate of air, as the measurement objective fluid, is to be measured.

The aforementioned flow sensor 10 includes a main body 14, which includes a flow passage (measuring chamber) 12 formed therein, for allowing air to flow therethrough, and a sensor 16 arranged so as to face the flow passage 12 and thereby measure the flow rate of the air that flows through the flow passage 12. The sensor 16 is integrally attached to a lower surface (back surface) of a sensor substrate 18. A detection surface 16b, having a detecting section 16a for measuring the air flow rate, faces the flow passage 12 (see FIGS. 3 and 6). Such a sensor 16 comprises, for example, a MEMS thermal type flow sensor chip, having a substantially square shape, wherein one side thereof (length L1 shown in FIG. 3) is about 1.4 mm.

Figure 3:
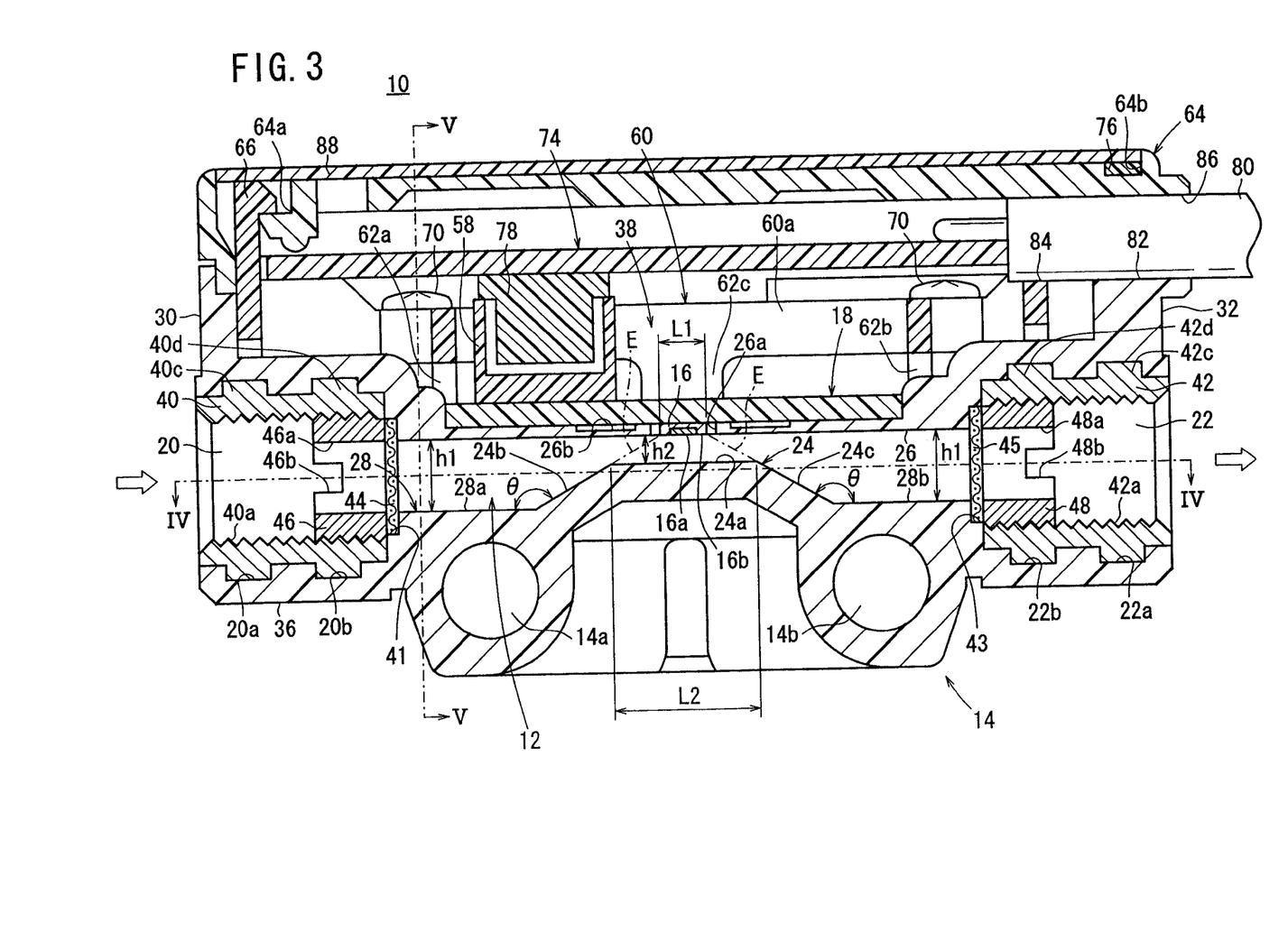
FIG. 3 is a longitudinal sectional view, taken along the flow direction of the fluid, illustrating the flow sensor shown in FIG. 1.
Figure 4:
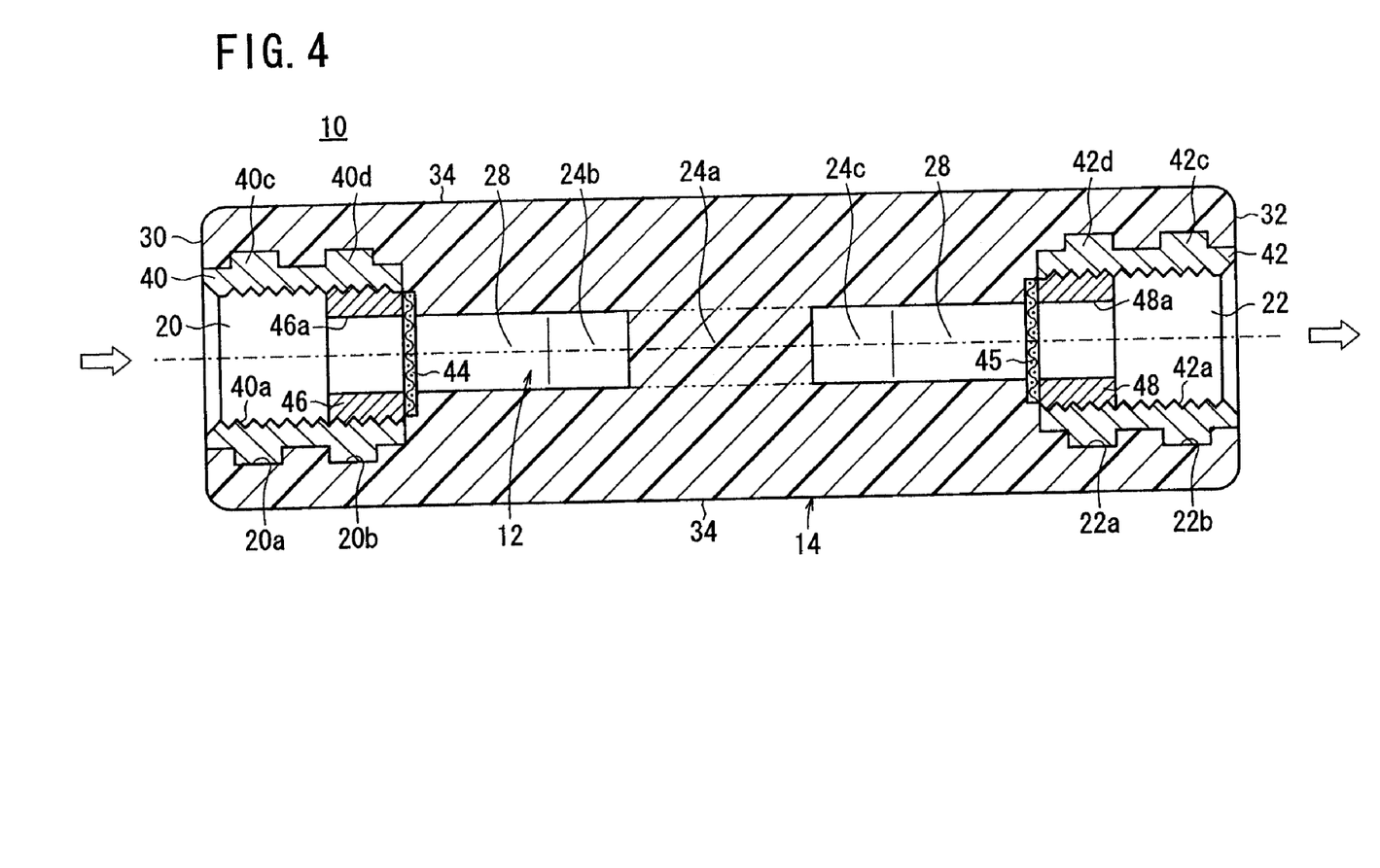
FIG. 4 is a sectional view taken along line IV-IV in FIG. 3.
Figure 5:
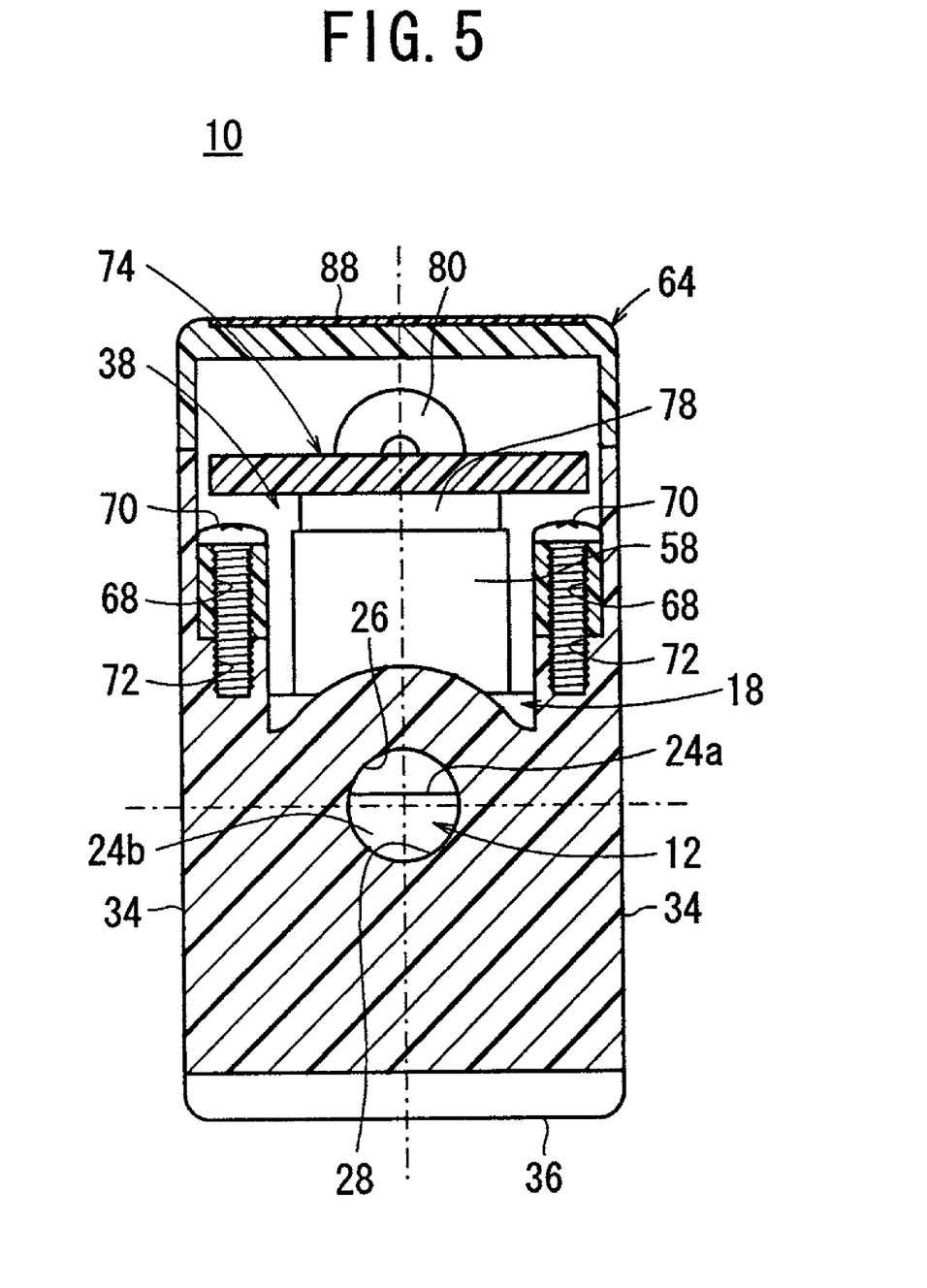
FIG. 5 is a sectional view taken along line V-V in FIG. 3.

As shown in FIGS. 3 and 4, the flow passage 12 is formed between an inlet 20 and an outlet 22, which are disposed at positions slightly lower than the center between both ends, in the longitudinal direction of the main body 14. The flow passage 12 has a circular cross section (see FIG. 5) when viewed in a direction perpendicular to the direction of the flow of air. A trapezoidal projection 24 is formed at a substantially central portion, as viewed in cross section, in the air flow direction (see FIG. 3). A sensor hole 26a is provided at a substantially central portion on a top wall (ceiling wall) 26 disposed over the flow passage 12, so that the sensor 16 faces the flow passage 12,. The projection 24 is provided under the flow passage 12 at a substantially central portion of a bottom wall 28 opposing the top wall 26.

The projection 24 has a throttle surface 24a, which is disposed in opposition to the sensor 16, and which has a flat surface corresponding to an upper side of the trapezoidal shape thereof. Further, the projection 24 has an inclined surface (first inclined surface) 24b and an inclined surface (second inclined surface) 24c, which are disposed continuously on the upstream side (on the side of the inlet 20) and the downstream side (on the side of the outlet 22) of the throttle surface 24a, so that the flow passage 12 widens toward the outside (toward the upstream side and the downstream side). The bottom wall 28a, which continues on the upstream side of the inclined surface 24b, communicates with the inlet 20. The bottom wall 28b, which continues on the downstream side of the inclined surface 24c, communicates with the outlet 22.

The length L2 of the throttle surface 24a extending in the air flow direction is, for example, about 5 mm. A substantially central portion thereof is disposed approximately at the same position as the center of the sensor 16. In this arrangement, the end of the throttle surface 24a on the upstream side should be positioned more toward the upstream side, as compared with the end of the sensor 16 on the upstream side. In order to sufficiently obtain a flow adjustment function at the portion of the throttle surface 24a, the length L2 of the throttle surface 24a should be larger than the length L1 of the sensor 16. However, if a value obtained by subtracting the length L1 from the length L2 becomes excessively large, measurement accuracy is lowered because pressure loss increases excessively. On the other hand, if the value is too small, then the sensor 16 may become damaged or broken, and measurement accuracy is lowered due to collision of air against the sensor 16 and due to an insufficient flow adjustment function. Therefore, concerning the relationship between the length L1 of the sensor 16 and the length L2 of the throttle surface 24a, the length L2 should preferably be two to five times the length L1. More preferably, the length L2 is three to four times the length L1.

The height h1 between the bottom wall 28a, 28b and the top wall 26 (i.e., the diameter of the flow passage 12) is, for example, about 2.6 mm at portions where each of the inclined surfaces 24b, 24c continue toward the outside. The height h2 between the throttle surface 24a and the top wall 26 is, for example, about 1 mm. If the height h2 is excessively large, then the flow adjustment function becomes deteriorated at the projection 24. On the other hand, if the height h2 is excessively small, then pressure loss is increased and the flow adjustment function tends to be lowered. Therefore, concerning the relationship between heights h1 and h2, it is preferable that the height h1 be set to about 1.5 to 4 times the height h2.

The angle θ (see FIG. 3) formed between the bottom wall 28a, 28b and each of the inclined surfaces 24b, 24c, is set to be, for example, not more than 150°. When the angle θ is provided as described above, an arrangement is provided in which an extension line extending from each of the inclined surfaces 24b, 24c passes through a position disposed on the outside (i.e., on the side of the inlet 20 or on the side of the outlet 22), which is offset from the detecting section 16a of the sensor 16 at the projection 24. In other words, each of the inclined surfaces 24b, 24c has an angle such that an extension line thereof intersects the top wall 26 at an outwardly offset position, as compared with the detecting section 16a of the sensor 16. Accordingly, air flowing from the inlet 20, flows (i.e., moves upwardly) along the inclined surface 24b, whereupon the air then abuts against the top wall 26 on an upstream side from the detecting section 16a of the sensor 16. Thereafter, the air flows along the throttle surface 24a in a direction toward the outlet 22.

The main body 14 having the flow passage 12 formed therein as described above comprises a box constructed by a front wall 30 in which the inlet 20 is formed, a back wall 32 in which the outlet 22 is formed, a pair of side walls 34, 34 provided between the front wall 30 and the back wall 32, and an outer bottom wall 36 provided at the bottom thereof. A groove 38 is formed in an upper portion of the main body 14 by the respective inner side surfaces of the front wall 30, the back wall 32, and the side walls 34, 34, and by the upper surface of the top wall 26 of the flow passage 12 (see FIG. 2). Two holes 14a, 14b, which penetrate in a widthwise direction, are formed in a lower portion of the main body 14. The holes 14a, 14b serve as attachment holes, which are used for fixing the flow sensor 10. The main body 14 is formed of a high molecular weight material, such as PPS (polyphenylene sulfide).

Two grooves 20a, 20b and 22a, 22b are disposed circumferentially along inner circumferential surfaces of the inlet 20 and the outlet 22, respectively (see FIG. 3). Insert nuts 40, 42 are arranged at the inlet 20 and the outlet 22, wherein the insert nuts 40, 42 have projections 40c, 40d and 42c, 42d provided circumferentially thereon having shapes adapted for insertion and fitting into the grooves 20a, 20b and 22a, 22b. Screw sections 40a, 42a are formed along inner circumferential surfaces of the insert nuts 40 and 42, as described above. Unillustrated joint members are attached to the screw sections 40a, 42a, for example, so that the flow sensor 10 can be connected, for example, to a predetermined piping arrangement.

Recesses 41, 43, each having diameters larger than the inner diameter (h1) of the flow passage 12, are provided at ends on the upstream and downstream sides of the flow passage 12. Meshes (mesh members) 44, 45 are arranged in the recesses 41, 43 via insert nuts 40, 42 on the outside of the inlet 20 and the outlet 22. The meshes 44, 45 are fixed by fixing screws 46, 48 which are threaded into the screw sections 40a, 42a. For example, the mesh 44 may also be installed only on the inlet 20 side, without installing the mesh 45 on the outlet 22 side.

The meshes 44, 45 have circular shapes with diameters larger than the inner diameter (h1) of the flow passage 12. Further, the meshes 44, 45 comprise wire meshes made of metal composed of stainless steel or the like. The aforementioned meshes 44, 45 perform a flow adjusting function to adjust the air that flows through the flow sensor 10, as well as a dust-removing function for removing dust, dirt or the like from the air.

Figure 1:
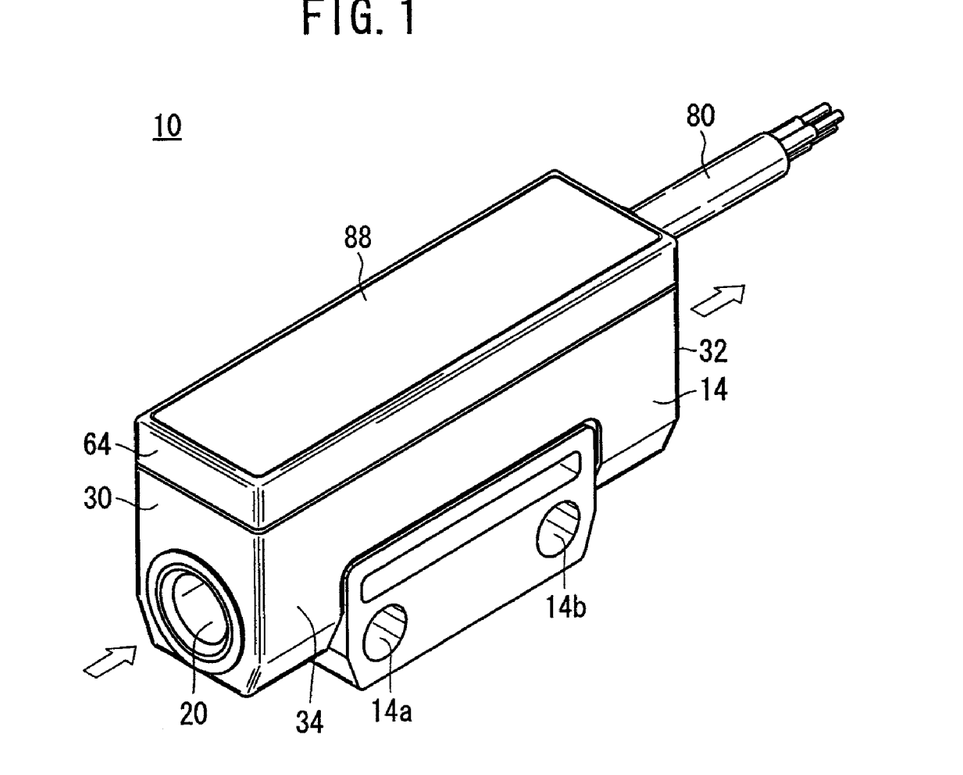
FIG. 1 is a perspective view illustrating a flow sensor according to an embodiment of the present invention.
Figure 2:
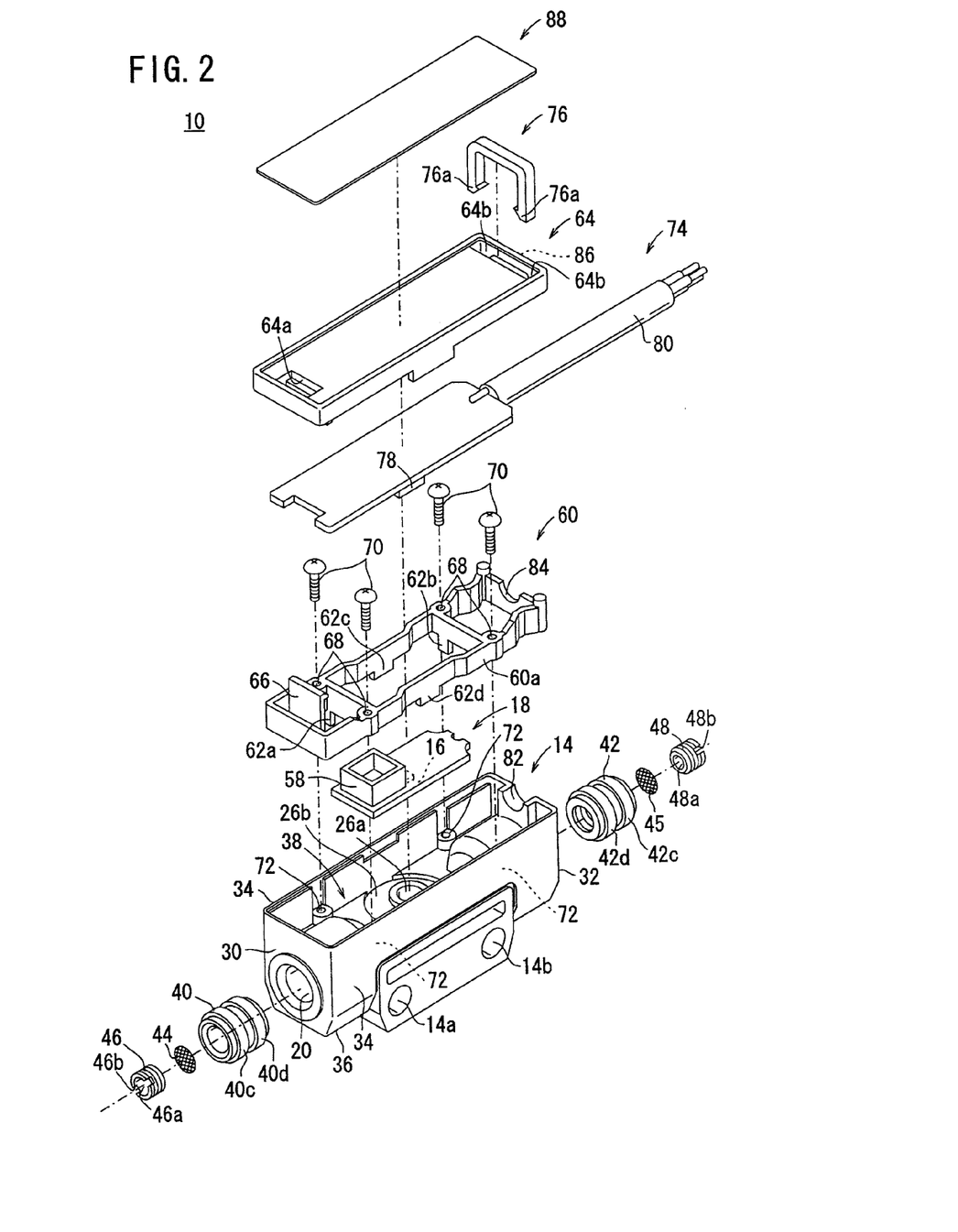
FIG. 2 is an exploded perspective view illustrating the flow sensor shown in FIG. 1.

The fixing screws 46, 48 have holes 46a, 48a therein, having approximately the same diameter as that of the flow passage 12, in order to allow air to flow toward the meshes 44, 45, and which function to fix the meshes 44, 45 by engagement with the screw sections 40a, 42a. With reference to FIGS. 2 and 3, cutouts 46b, 48b are provided in the fixing screws 46, 48, which form engaging grooves for engagement with an unillustrated tool in order to perform threading of the fixing screws 46, 48.

As described above, the sensor 16 is provided on a lower surface of the sensor substrate 18 (on the side of the top wall 26). By placing the sensor substrate 18 on the upper surface of the top wall 26 in the groove 38, the sensor 16 is positioned so as to face the flow passage 12 from the sensor hole 26a, wherein the sensor hole 26a is enclosed by the sensor substrate 18.

The height of the sensor 16 is approximately the same as the height of the top wall 26. Therefore, the detection surface 16b of the sensor 16 is arranged at approximately the same position as that of the lower surface of the top wall 26 (the side surface of the flow passage 12). A ring-shaped recess 26b is formed on the upper surface of the top wall 26 around the sensor hole 26a. An unillustrated liquid sealant is applied to an outer circumferential portion in order to prevent leakage of air from the sensor hole 26a, so that the sensor substrate 18 is arranged in tight contact with respect to the upper surface of the top wall 26. In this case, the recess 26b functions as an outflow-preventive section (dam) to prevent the liquid sealant from flowing out of the sensor hole 26a into the flow passage 12 and adhering to the sensor 16. The aforementioned liquid sealant may be cured by raising the temperature thereof. A gasket (sealing material) composed of an elastic material or the like may also be used in place of the liquid sealant in order to avoid leakage of air from the sensor hole 26a.

Figure 6:
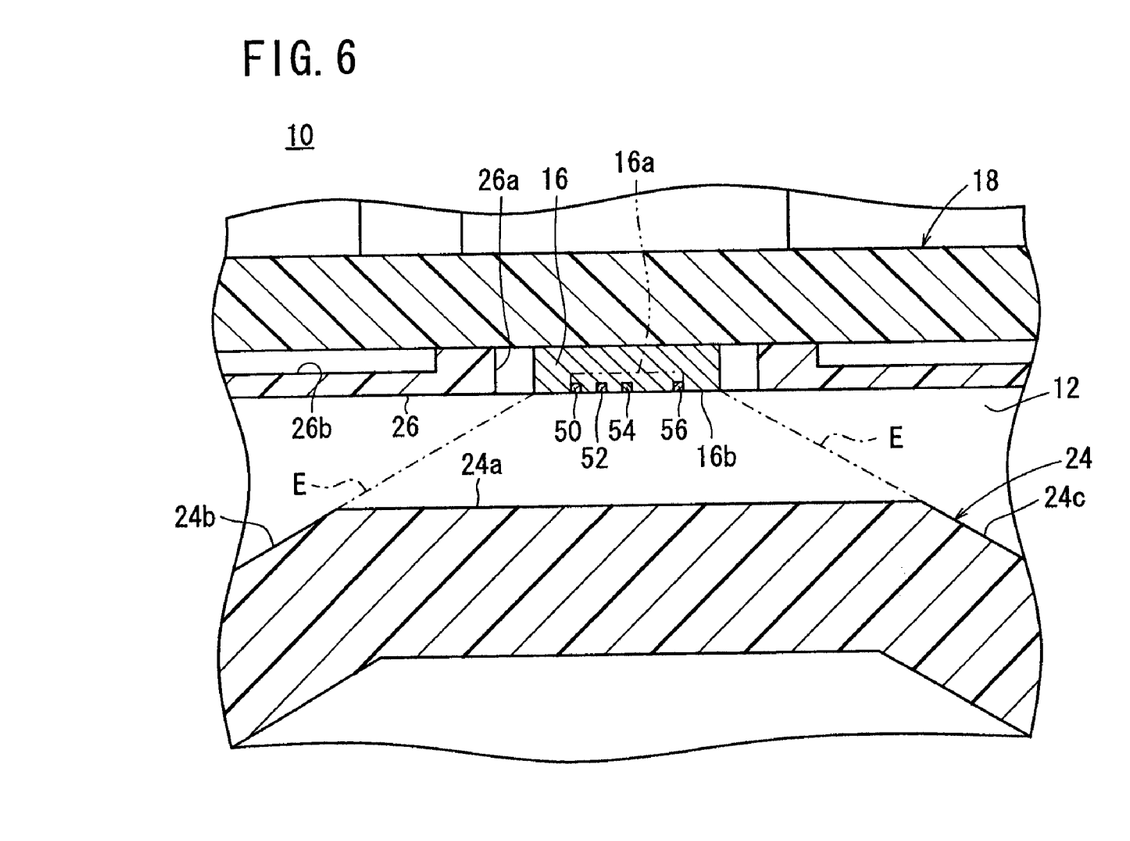
FIG. 6 is a magnified sectional view, illustrating elements disposd in the vicinity of the sensor element of the flow sensor shown in FIG. 3.

FIG. 6 is a magnified sectional view, showing elements disposed in the vicinity of the sensor 16. The sensor 16 has a detection surface 16b, which faces the flow passage 12. The detection surface 16b includes, in this order from the upstream side, an upstream side temperature-measuring element 50 forming the detecting section 16a, a heat-generating element (heater) 52, a downstream side temperature-measuring element 54, and a circumferential temperature-measuring element 56. The upstream side temperature-measuring element and the other components are connected to one another through a bridge circuit, for example, provided in the sensor 16.

The distances between the heat-generating element 52, the upstream side temperature-measuring element 50 and the downstream side temperature-measuring element 54 are equal to one another. On the other hand, the circumferential temperature-measuring element 56 is disposed at a position that is slightly separated from the downstream side temperature-measuring element 54, so that the circumferential temperature-measuring element 56 is not influenced by heat exerted from the heat-generating element 52. The distance between the circumferential temperature-measuring element 56 and the downstream side temperature-measuring element 54 is sufficiently larger than the distance between the heat-generating element 52 and the upstream side temperature-measuring element 50. The sensor 16 constructed as described above comprises a MEMS thermal type flow sensor chip, for calculating flow velocity and flow rate based on a relationship between the temperature difference between the elements positioned before and after the heat-generating element 52, as measured by the upstream side temperature-measuring element 50 and the downstream side temperature-measuring element 54, as well as the air temperature (ambient temperature) of air that flows inwardly and outwardly as measured by the circumferential temperature-measuring element 56.

On the other hand, a connector 58 and other unillustrated elements for performing various functions are disposed on the upper surface of the sensor substrate 18 (i.e., on a side thereof opposite to the sensor 16) (see FIGS. 2 and 3).

The sensor substrate 18 constructed as described above is fixed by a spacer 60 disposed thereon such that the sensor substrate 18 is placed within the groove 38 on the upper surface of the top wall 26. The spacer 60 comprises a frame that can be accommodated within the groove 38. The spacer 60 includes a frame 60a, four pawl members 62a to 62d that protrude downwardly from the frame 60a and press against the sensor substrate 18, an engaging pawl 66 that acts to secure a cover 64 as described later on, and four holes 68 formed in the frame 60a. Bolts 70 are inserted into the holes 68, respectively. The bolts 70 are threaded into four screw sections 72, respectively, which are provided in the groove 38 of the main body 14. Accordingly, the spacer 60 is fixed to the main body 14 such that the sensor substrate 18 is interposed by the spacer 60. In other words, the sensor substrate 18 is fixed to the main body 14.

An output substrate 74 is arranged in the groove 38 over the spacer 60. The output substrate 74 is fixed to the spacer 60 by the cover 64 and a snap pin 76. The output substrate 74 functions as a substrate for supplying electrical power to the sensor 16 and for outputting a voltage to the outside.

The output substrate 74 includes a connector 78, which is provided on the lower surface to engage with the connector 58, as described above. Unillustrated elements for performing various other functions may be provided on the upper surface of the output substrate 74. A power source cable 80 is attached to one end surface on a downstream side of the output substrate 74. The output substrate 74 is electrically connected by the connector 78 and via the connector 58 to the sensor substrate 18. Accordingly, the output substrate 74 functions to supply electric power to the sensor 16 from an unillustrated power source, and moreover, an output signal (voltage) from the sensor 16 is transmitted thereby to an external apparatus.

The cover 64 functions as a lid enclosing the upper portion of the groove 38. The cover 64 includes an engaging section 64a, which is provided on an upstream side end thereof, through which the engaging pawl 66 penetrates to effect engagement. The cover 64 also includes a hole 64b, which is provided on a downstream side end thereof, into which a pawl 76a of the snap pin 76 is inserted. The pawl 76a is inserted through the hole 64b and engages with the frame 60a.

The cover 64 is fixed onto the spacer 60 upwardly thereof by engagement between the engaging section 64a and the engaging pawl 66, and by engagement between the snap pin 76 and the frame 60a, such that the output substrate 74 is placed on the frame 60a of the spacer 60. In this case, the power source cable 80 is surrounded by a lower side semicircular section 82 disposed on an upper portion of the back wall 32 of the main body 14, a lower side semicircular section 84 disposed on an end surface of the frame 60a on a downstream side thereof, and an upper side semicircular section 86 disposed on an end surface of the cover 64 on a downstream side thereof. Thus, the power source cable 80 is fixed in position, and accordingly, the output substrate 74 is reliably fixed to the spacer 60.

The upper surface of the cover 64 is positioned slightly lower than the circumferential edge portion. An inscription plate 88 is adhered to the upper surface, wherein the inscription plate 88 indicates, for example, the model number of the flow sensor 10 and the air flow direction.

The respective parts of the flow sensor 10 are integrally assembled, as described above, such that the sensor substrate 18, the output substrate 74, and the other components are accommodated and fixed within the groove 38 of the main body 14, and then the components are enclosed by the cover 64.

Next, an explanation shall be given concerning the functions and effects of the flow sensor 10, which is constructed essentially as described above.

The flow sensor 10 is connected to an intermediate portion of the flow passage, in which air flows as the measurement objective fluid, by attachment of unillustrated joint members to the insert nuts 40, 42 of the inlet 20 and the outlet 22. Further, the power source cable 80 is connected to an unillustrated power source and to an external apparatus, whereby the air flow rate can be measured.

As shown in FIG. 3, air flows from the inlet 20 in the direction of the arrow and is subjected to flow adjustment and dust removal by the mesh 44, whereupon the air then flows into the flow passage 12. A portion of the air that flows into the flow passage 12 passes through an upper portion of the flow passage 12 along the top wall 26, whereupon the air flows from the outlet 22 after passing through a space disposed between the throttle surface 24a and the top wall 26. On the other hand, another portion of the air flows into the flow passage 12 and passes through the lower portion of the flow passage 12 along the bottom wall 28a, whereupon the air moves upwardly along the inclined surface 24b and passes through a space formed between the throttle surface 24a and the top wall 26, and the air flows outwardly from the outlet 22. The space between the throttle surface 24a and the top wall 26 is throttled (narrowed) sufficiently in comparison with the inlet 20. Therefore, air passes on one side of the detection surface 16b of the sensor 16, while the air is subjected sufficiently to flow adjustment. Accordingly, the sensor 16 measures the air flow rate, whereby a voltage that is proportional to the magnitude of the flow rate is output via the power source cable 80 to an external apparatus.

For measuring the flow rate as described above, the trapezoidal projection 24 is formed in the flow passage 12 of the flow sensor 10 according to the embodiment of the present invention, wherein the flow passage 12 of the flow sensor 10 has a trapezoidal structure including the throttle surface 24a and the inclined surface 24b. Accordingly, air flow is stabilized at the inclined surface 24b, in addition to the flow adjustment function effected by the meshes 44, 45. Therefore, an adverse exfoliation phenomenon of air on the respective wall surfaces of the flow passage 12 can be suppressed. Therefore, the flow rate can be measured stably, with respect to flow rates over a wide range, ranging from both low flow rates to high flow rates.

Due to the trapezoidal structure of the flow passage 12, the flow rate can be measured with sufficient accuracy, even when the shapes of pipes disposed and connected before and after the flow sensor 10 are changed from a diameter of 8 mm to 4 mm, for example. Owing to the aforementioned trapezoidal structure, straight line portions in the piping portions disposed and connected before and after the flow sensor 10 are not required in order to stabilize the flow. Therefore, the flow sensor 10 can be installed with greater freedom.

As a result of the flow adjustment function performed by the trapezoidal structure, the number of meshes 44, 45 can successfully be minimized, for example, to only one mesh. Therefore, it is possible to reduce product size and production costs. Further, production efficiency is improved.

In the conventional technique described in Japanese Laid-Open Patent Publication No. 2004-3887, air flow is adjusted by means of the circular arc-shaped surface of the flow passage. Therefore, if air having a large flow rate suddenly flows into the flow passage, then the air is lifted upwardly by the circular arc-shaped surface and collides against the sensor. Thus, it is feared that the sensor may become damaged or broken. By contrast, in the flow sensor 10 according to the embodiment of the present invention, owing to the aforementioned trapezoidal structure, air that flows along the inclined surface 24b flows toward the upstream side, which is offset from the detecting section 16a, without directly colliding against the detecting section 16a of the sensor 16, wherein the air simply passes over the detection surface 16b portion. Therefore, for example, even if air having a large flow rate flows suddenly into the flow passage, damage or breakage of the detecting section 16a of the sensor 16 can be avoided.

In the flow sensor 10, the meshes 44, 45 can easily be attached and detached by means of the fixing screws 46, 48. Therefore, for example, when dust or the like becomes adhered to the mesh 44, a user can easily exchange the mesh 44.

In the case of the structure of the conventional technique, which uses a mesh member, as described in Japanese Laid-Open Patent Publication No. 2005-315788, measurement accuracy tends to fluctuate when the mesh member is exchanged. Therefore, it is necessary to conduct adjustment operations whenever the mesh member is changed. However, in the flow sensor 10 according to the present embodiment, the flow adjustment function is effected by the trapezoidal structure, wherein the number of meshes 44, 45 is minimized. Therefore, fluctuations in the degree of measurement accuracy, brought about by exchanging the meshes 44, 45, are extremely small. In other words, the air flow can be adjusted by means of the trapezoidal structure of the projection 24. Therefore, when the meshes 44, 45 are exchanged, only a small influence is exerted on the overall flow adjustment function of the flow passage 12. Therefore, replacement or exchanging of the meshes 44, 45 can be easily performed.

Figure 7:
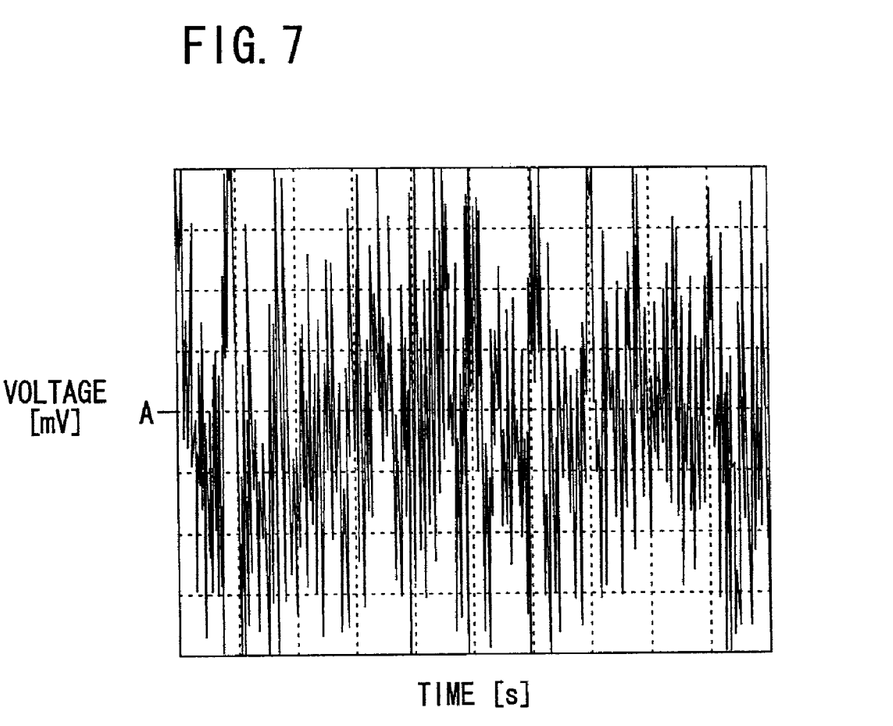
FIG. 7 is a graph illustrating results of measurement of the flow rate, in an arrangement in which neither a mesh nor a projection is provided.
Figure 8:
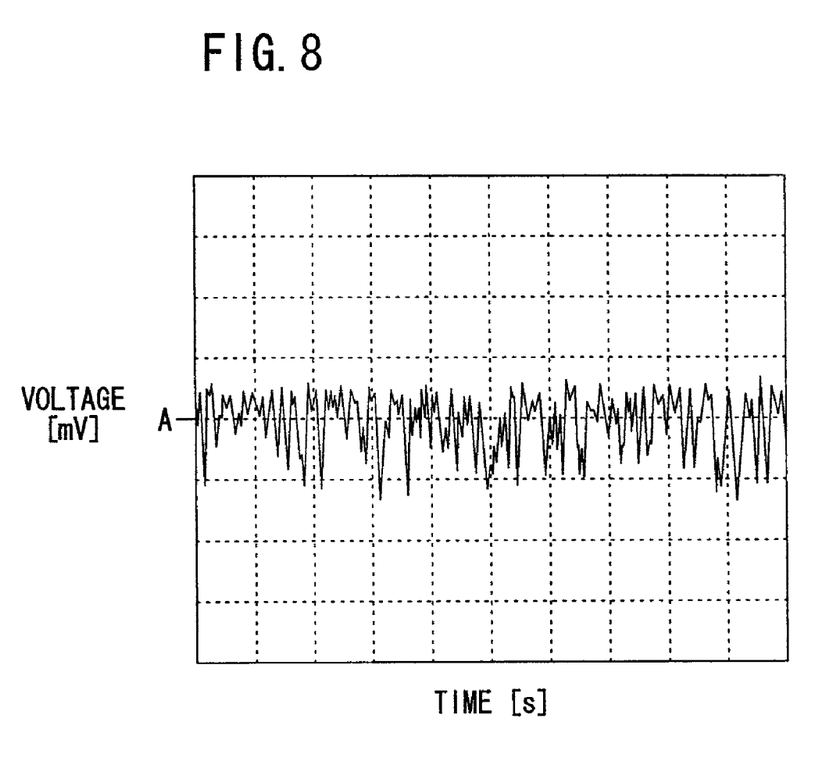
FIG. 8 is a graph illustrating results of measurement of the flow rate, in an arrangement in which one mesh is provided but wherein a projection is not provided.
Figure 9:
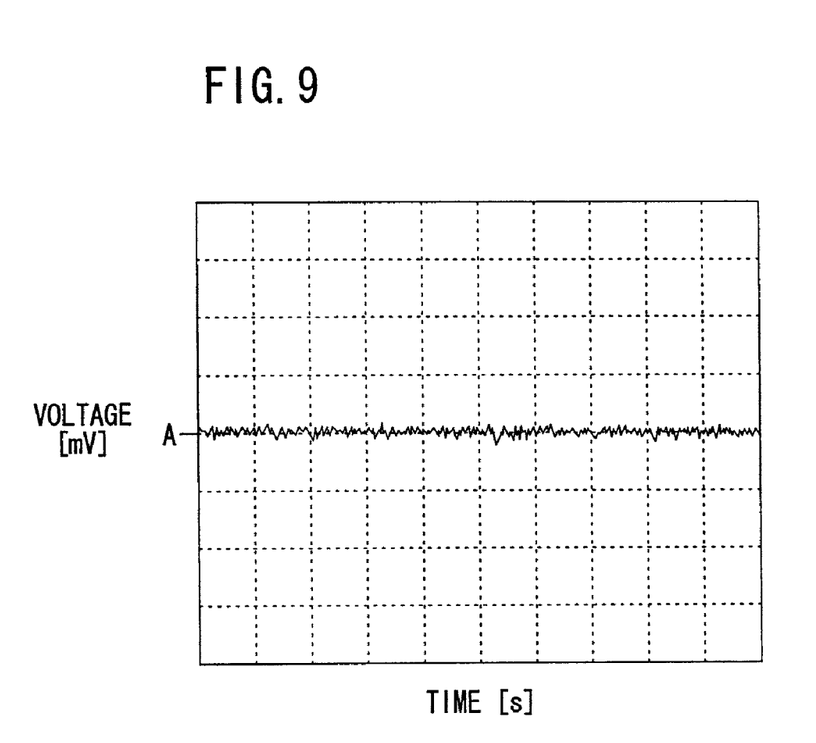
FIG. 9 is a graph illustrating results of measurement of the flow rate, in an arrangement in which both one mesh and a projection are provided.

With reference to FIGS. 7 to 9, an explanation shall be made of experimental results, which show the influence of the trapezoidal structure of the projection 24 on the detection accuracy of the sensor 16. FIGS. 7 to 9 are graphs illustrating the output voltage value (flow rate value) brought about by the sensor 16, in a state in which air having a constant flow rate continuously flows through the sensor 16. Time (sec) is indicated on the horizontal axis, whereas voltage (mV) is indicated on the vertical axis. In this case, the theoretical output voltage of the sensor 16, which is expected to be obtained when air having a constant flow rate flows through the sensor 16 as described above, is set to A (mV), as shown in FIGS. 7 to 9.

FIG. 7 shows results obtained with an arrangement in which the meshes 44, 45 and the projection 24 were not provided. FIG. 8 shows results obtained with an arrangement in which one of the meshes 44, 45 was provided but the projection 24 was not provided. FIG. 9 shows results obtained with an arrangement in which one of the meshes 44, 45 was provided together with the projection 24, i.e., results obtained with a flow sensor 10 according to the present embodiment of the present invention.

As shown in FIGS. 7 and 8, if the projection 24 is not provided and no mesh 44, 45 or only one mesh 44, 45 is provided, then the output voltage of the sensor 16 cannot be stabilized and large noise is generated. It is assumed that such noise, as described above, is generated because the air is not sufficiently subjected to flow adjustment.

On the other hand, as shown in FIG. 9, when the projection 24 is provided with one of the meshes 44, 45, i.e., in a flow sensor 10 according to the embodiment of the present invention, noise is extremely small, and the flow rate can be measured stably and highly accurately. As clearly understood from the results, stable and highly accurate measurements can be performed by providing the projection 24 together with the trapezoidal structure of the flow passage 12.

Even if the projection 24 is not provided, it is still possible to sufficiently adjust air flow by increasing the number of meshes 44, 45. However, in this case, an inconvenience arises in that the length of the flow sensor is increased in the longitudinal direction. When a plurality of meshes 44, 45 are used, product reproducibility depends on the attachment positions, positioning accuracy, and the number of meshes 44, 45 employed. Therefore, problems occur in that assembling performance (production efficiency) and quality become inferior. However, in the flow sensor 10 of the present invention, assembling performance (production efficiency) and quality can be improved, while minimizing size, due to the trapezoidal structure of the projection 24.

In the embodiment described above, air flows from the inlet 20 into the flow passage 12. However, the flow sensor 10 includes the inclined surface 24c, in addition to the inclined surface 24b. Therefore, the flow sensor 10 can also be installed such that air is allowed to flow from the outlet 22 into the flow passage 12. Therefore, the degree of freedom in installing the flow sensor 10 is high.

The foregoing embodiment has been explained using air as the measurement objective fluid by way of example. However, it goes without saying that the present invention also enables measurements of flow rates of fluids other than air, including, for example, nitrogen and various other gases.

In the embodiment described above, the cross-sectional shape of the flow passage 12 is circular. However, the invention is not limited to such a circular shape. The cross-sectional shape can also be, for example, a rectangular shape.

The present invention is not limited to the embodiment described above. It is a matter of course that the present invention can be embodied and assume various other forms without deviating from the gist or essential characteristics of the present invention.

What is claimed is:

1. A flow sensor comprising:
   a main body including a flow passage formed at least by a top wall and a bottom wall, wherein a measurement objective fluid flows through said flow passage; and
   a sensor arranged along said top wall forming said flow passage so as to face said flow passage,
   wherein said flow passage includes a throttle surface opposed to said sensor, and a first inclined surface formed continuously and with a constant angle on an upstream side of said throttle surface, said first inclined surface being disposed such that said flow passage, which is formed between said top wall and said first inclined surface, widens toward said upstream side, and wherein said constant angle of said first inclined surface is formed such that an extension line of said first inclined surface, which is directed toward a downstream side, passes through a position offset toward said upstream side, as compared with a detecting section that is provided on a detection surface of said sensor.

2. The flow sensor according to claim 1, further comprising:

a second inclined surface formed continuously and with a constant angle on said downstream side of said throttle surface, said second inclined surface being provided such that said flow passage, which is formed between said top wall and said second inclined surface, widens toward said downstream side, wherein said constant angle of said second inclined surface is formed such that an extension line of said second inclined surface passes through a position offset toward said downstream side, as compared with said detecting section that is provided on said detection surface of said sensor.

3. The flow sensor according to claim 2, wherein an angle formed by a first inclined surface and said bottom wall that continues on said upstream side of said first inclined surface, and/or an angle formed by said second inclined surface and said bottom wall that continues on said downstream side of said second inclined surface, is not more than 150°.

4. The flow sensor according to claim 1, wherein an angle formed by said first inclined surface and said bottom wall that continues on said upstream side of said first inclined surface is not more than 150°.

5. The flow sensor according to claim 1, wherein a length of said throttle surface in a flow direction of said measurement objective fluid is larger than a length of said sensor in said flow direction.

6. The flow sensor according to claim 1, wherein a mesh member is disposed on an inlet side and/or an outlet side of said flow passage.

7. The flow sensor according to claim 6, wherein said mesh member is attached by means of a fixing screw, thereby allowing said measurement objective fluid to flow through said mesh member.

8. The flow sensor according to claim 1, wherein a projection, having a trapezoidal cross-sectional shape formed in a flow direction of said measurement objective fluid, is disposed on said bottom wall opposed to said top wall of said flow passage, and wherein said throttle surface, which is opposed to said sensor and disposed in parallel to said top wall, is formed on said projection.

* * * * *